United States Patent
Kostromin et al.

(10) Patent No.: US 12,098,336 B2
(45) Date of Patent: Sep. 24, 2024

(54) DRAG REDUCING AGENT

(71) Applicant: IRIS TECH, INC., Houston, TX (US)

(72) Inventors: Roman Nikolaevich Kostromin, Kazan (RU); Aleksandr Aleksandrovich Nikitin, Kazan (RU); Vladimir Dmitrievich Morozov, Mamadysh (RU); Igor Aleksandrovich Malykhin, Moscow (RU)

(73) Assignee: IRIS TECH, INC., Houston, TX (US)

( * ) Notice: Subject to any disclaimer, the term of this patent is extended or adjusted under 35 U.S.C. 154(b) by 0 days.

(21) Appl. No.: 18/115,134

(22) Filed: Feb. 28, 2023

(65) Prior Publication Data
US 2023/0227740 A1   Jul. 20, 2023

Related U.S. Application Data (63) Continuation-in-part of application No. 17/568,152, filed on Jan. 4, 2022, now abandoned.

(51) Int. Cl.
  *C10G 71/00* (2006.01)
  *C08F 210/14* (2006.01)
  (Continued)

(52) U.S. Cl.
  CPC .......... *C10G 71/00* (2013.01); *C08F 210/14* (2013.01); *C08F 220/1804* (2020.02);
  (Continued)

(58) Field of Classification Search
  CPC .......... C10G 71/00; C10G 2300/4075; C10G 2300/80; C10G 75/04; C08F 210/14;
  (Continued)

(56) References Cited

U.S. PATENT DOCUMENTS

| | | |
|---|---|---|
| 4,693,321 A | 9/1987 | Royer |
| 6,841,593 B2 | 1/2005 | Kommareddi et al. |
| (Continued) | | |

FOREIGN PATENT DOCUMENTS

| | | |
|---|---|---|
| RU | 2743532 | 2/2021 |
| WO | 2009055114 | 4/2009 |
| WO | 2018115191 | 6/2018 |

*Primary Examiner* — Taiwo Oladapo
(74) *Attorney, Agent, or Firm* — Nadya Reingand

(57) ABSTRACT

This invention relates to drag reducing agents used in case of transportation of crude oil products, in particular, to solid dry poly(meth)acrylate with dry poly alpha-olefins powders based agents. The technical result of the solution involves the preparation of an effective, fast-dissolving, stable solid dry drag reducing agent suitable for use in heavy crude oil. The drag reducing agents compositions have better drag reducing performance in heavy crude applications as compared with traditional drag reducing slurries is also disclosed, which consists of the following components, wt %:

a mixture of at least two drag reducing polymers, from 65 to 90
  a separating agent from 3 to 25
  anti-agglomerating agent from 3 to 25
  a surfactant from 3 to 25,
  where the first polymer is poly(meth)acrylate, the second polymer is poly alpha-olefin, the ratio of the polyacrylate weight and polyalphaolefin weight varies in the range from 2:1 to 5:1.

11 Claims, 1 Drawing Sheet

To DRAG REDUCING AGENT Application

The dissolution dynamics of the samples of latex additives in oil at 60 °C.

(51) Int. Cl.
  *C08F 220/18* (2006.01)
  *C08L 33/08* (2006.01)
(52) U.S. Cl.
  CPC ........ *C08F 220/1808* (2020.02); *C08L 33/08* (2013.01); *C10G 2300/4075* (2013.01); *C10G 2300/80* (2013.01)
(58) Field of Classification Search
  CPC ......... C08F 220/1804; C08F 220/1808; C08F 2/26; C08L 33/08
  See application file for complete search history.

(56) References Cited

U.S. PATENT DOCUMENTS

| | | | |
|---|---|---|---|
| 9,644,161 | B2 | 5/2017 | Kommareddi et al. |
| 11,473,033 | B1 | 10/2022 | Morozov et al. |
| 2004/0163306 | A1 | 8/2004 | Dahlmann et al. |
| 2005/0094486 | A1 | 5/2005 | Taniguchi |
| 2005/0209368 | A1 | 9/2005 | Yang et al. |
| 2008/0064785 | A1 | 3/2008 | Martin et al. |
| 2009/0107554 | A1* | 4/2009 | Milligan .............. B01J 19/2435 524/394 |
| 2019/0390107 | A1 | 12/2019 | Vittur et al. |

* cited by examiner

The dissolution dynamics of the samples of latex additives in oil at 60 °C.

DRAG REDUCING AGENT

FIELD OF THE INVENTION

This invention relates to drag reducing agents used in a conduit transportation of petroleum products, in particular, to solid dry polyacrylate and polyalphaolefinbased agents.

BACKGROUND

There are plasticized latex formulations for improved pumpability (U.S. Pat. No. 9,644,161B2, publ. on 2015 Oct. 15). The solution discloses that hydrocarbon streams, such as crude oil streams, may have reduced drag when an effective amount of a drag reducing composition is added to a liquid hydrocarbon fluid, where the drag reducing composition includes a drag reducing latex comprising at least one plasticizer in an amount effective to improve the ability to pump the latex into a hydrocarbon composition. Latex formulations are known to cause agglomerated particles during product storage and pumping operations, and the agglomerated hard particles tend to plug check valves in injection pump equipment, but the inclusion of at least one plasticizer reduces or prevents such problems.

This hydrocarbon composition having reduced drag comprising: a liquid hydrocarbon selected from the group consisting of crude oil, heavy oil, gasoline, diesel fuel, asphaltene, and mixtures thereof; and an effective amount of a drag reducing composition to reduce the hydro dynamic drag of the liquid hydrocarbon fluid, where the drag reducing composition comprising:

a drag reducing dry latex comprising:
  a polymer having at least one monomer selected from the group consisting of acrylates, methacrylates, 2-Ethylhexyl methacrylate, isobutyl methacrylate, butyl methacrylate, 2-Ethylhexyl acrylate, isobutyl acrylate, butyl acrylate, C1 to C6 alcohol esters of acrylic acid or methacrylic acid, styrene, acrylic acid, and combinations thereof;
  at least one plasticizer in an amount effective to improve the ability to pump the dry drag reducing latex into the liquid hydrocarbon conduits, where the weight ratio of the at least one plasticizer to drag reducing latex ranges from about 1/99 to about 10/90; and at least one polyether amine.

However, this embodiment discloses a latex drag reducing agent (DRA), which is a liquid, not a solid. Therefore, the percentage of the polymeric flow improvers is low in the formulation; in case of storage of the latex composition, take actions to retain its properties, prevent cream formation, etc.

There are non-crystalline, hydrocarbon soluble polymeric flow improvers (U.S. Pat. No. 4,693,321A, publ. on 1987-09-15), which are encapsulated to form free-flowing particles comprising normally non-crystalline, hydrocarbon soluble polymers, with molecular weight above 1×106 dalton. Polyalphaolefins are used as flow improvers; the urea-formaldehyde resin is used as an encapsulant.

However, polyalphaolefins are used as the polymer in this solution, which cannot be used in heavy oil.

There is a particulate compound for modifying a characteristic of a fluid (U.S. Pat. No. 6,841,593B2, publ. on 2003-01-16), comprising:

a core comprising the compound selected from the group consisting of:
  polymers formed within a shell;
  monomers which are polymerized within the shell, where the shell is inert to monomer polymerization; and
  the shell encapsulating the core,
  where the encapsulated compound is cryogenically ground to form the particulate compound where the shell acts as an anti-agglomerating agent,
  where the core is one of the alpha-olefins, such as 1-hexene, 1-octene, 1-decene, 1-dodecene, 1-tetradecene, and the like; isobutylene; alkyl acrylates; alkyl methacrylates.

The shell may be selected from the group comprising polybutylene, polymethacrylates, waxes, polyethylene glycol (PEG), polypropylene glycol (PPG), cg alkoxyl terminated PEG, polyethylene oxide (PEO), polypropylene oxide (PPO), stearic acid, polyethylene waxes, and mixtures thereof.

However, this solution discloses an encapsulated agent that is more difficult to produce, less easy to use, and which contains a small percentage of the active base relative to the total weight of the agent.

There is a powder agent reducing the hydrodynamic resistance of a turbulent flow of liquid hydrocarbons in pipelines (RU2743532C1, publ. on 2021.02.19), characterized by a high, not less than 75 wt % content of polyalphaolefin having the properties of reducing the hydrodynamic resistance of a turbulent flow of liquid hydrocarbons. However, the agent additionally comprises a monofunctional heteroatomic organic compound with the number of carbon atoms from 3 to 16, containing oxygen, nitrogen as a heteroatom, and a bifunctional heteroatomic organic compound with the number of carbon atoms from 2 to 16, containing oxygen, nitrogen, sulfur, phosphorus as a heteroatom and a separating agent (anti-agglomerating agent) with the following ratio of components in the composition, wt %:

Finely dispersed polyalphaolefin powder—from 75 to 90,
Separating agent (antiagglomerator)—from 2 to 15,
Monofunctional heteroatomic organic compound with the number of carbon atoms from 3 to 16- from 1 to 10,
Bifunctional heteroatomic organic compound with the number of carbon atoms from 2 to 16- from 1 to 10

However, this solution discloses a polyalphaolefin additive that cannot be used in case of transportation of heavy oil.

There is a drag reducing agent (WO2009055114, publ. on 2009-04-30), comprising a plurality of particles comprising a non-polyalphaolefin polymer. The particles are dispersed in a carrier fluid and have an average particle size in the range of from about 5 to about 800 micrometers. The polymer has a weight average molecular weight of at least about 1×106 g/mol.

However, smaller polymer particles are used in this applications. These particles contain short chain branches on polymer backbone, as a result, this agent has poor anti-friction properties and tendency to form agglomerated polymer particles with the absence of anti-agglomerating agents. Also, a larger particle size fractions of the agent have relatively lower surface area and requires lower percentile of surfactants and anti-agglomerating agents which results in a higher percentage of active polymer in the agent.

There is a prototype drag reducing agent (U.S. Pat. No. 7,842,738B2 publ. on 2009-04-30), comprising at least two different drag reducing polymers. The different drag reducing polymers can be formed by different processes, such as bulk polymerization or emulsion polymerization, and the particles of the different drag reducing polymers can have different mean particle sizes. The first drag reducing polymer is a polyalphaolefin polymer and the second drag reducing polymer is a non-polyalphaolefin polymer.

However, in this patent disclosure liquid polymer slurries with different ratios of active ingredients are covered, which cannot be used in heavy oils.

SUMMARY

In one aspect of the solution, an agent for reducing a hydrodynamic drag of a turbulent flow of hydrocarbon liquids in pipelines, comprising the following components, wt %:
- a mixture of at least two drag reducing polymers, from 65 to 90
- a separating agent from 3 to 25
- anti-agglomerating agent from 3 to 25
- a surfactant from 2 to 25,
- where the first polymer is at least one of poly(meth) acrylate derivatives such as 1-adamantyl methacrylate, benzyl methacrylate, methylmethacrylate, butyl methacrylate, decyl methacrylate, diethylene glycol ether methacrylate, 2-(diethyl amino) ethyl methacrylate, 2-(diisopropyl amino) ethyl methacrylate, 2-(dimethyl amino) ethyl methacrylate, diethylene glycol ether butyl methacrylate, dodecyl methacrylate, ethylene glycol phenyl ether methacrylate, 2-ethyl-2-adamantyl methacrylate, 2-ethyl hexyl methacrylate, glycol methacrylate phosphate, hexyl methacrylate, octyl methacrylate, 2-hydroxy ethyl methacrylate, isobutyl methacrylate, iso-octyl methacrylate, isodecyl methacrylate, stearyl methacrylate, 1-adamantyl acrylate, benzyl acrylate, butyl acrylate, decyl acrylate, diethylene glycol ether acrylate, 2-(diethyl amino) ethyl acrylate, 2-(diisopropyl amino) ethyl acrylate, 2-(dimethyl amino) ethyl acrylate, diethylene glycol ether butyl acrylate, dodecyl acrylate, ethylene glycol phenyl ether acrylate, 2-ethyl-2-adamantyl acrylate, 2-ethyl hexyl acrylate, hexyl acrylate, octyl acrylate, 2-hydroxy ethyl acrylate, isobutyl acrylate, iso-octyl acrylate, isodecyl acrylate, stearyl acrylate, acrylic acid, 2-acylamido-2-methyl-1-propanesulfonic acid, 2-acylamido-2-methyl-1-propanesulfonic acid sodium or potassium salts, C1 to C6 alcohol esters of acrylic acid or methacrylic acid, styrene, and combinations thereof, the second polymer is at least one of polyalphaolefin such as 1-hexene, 1-octene, 1-decene, 1-dodecene, 1-tetradecene and combinations of thereof, the ratio of the poly(meth) acrylate weight and polyalphaolefin weight varies in the range from 2:1 to 5:1.

Under certain conditions, the percentage of the mixture of at least two drag reducing polymers can be as high as 95 or 97 percent. Said percentage depends on the properties of polymers, their production technology and application conditions. If a dosing station contains a means of grinding said polymers, then the requirements for the percentage of the anti-agglomerating agent and the separating agent are reduced.

In additional aspects, it is disclosed that the separating agent is at least one of the following, a monofunctional heteroatomic organic compound with a carbon skeleton having a length from 4 to 28 units, polydimethylsiloxane; the monofunctional heteroatomic organic compound is fatty alcohol containing from 4 to 28 carbon atoms, aliphatic esters containing from 4 to 28 carbon atoms, aliphatic hydroxy carboxylic containing from 4 to 28 carbon atoms, bifunctional heteroatomic glycol containing from 4 to 28 carbon atoms; the monofunctional heteroatomic organic compound is at least one of isomers of propanol, butanol, pentanol, hexanol, heptanol, octanol, nonanol, decanol, undecanol, dodecanol, tridecanol, tetradecanol, pentadecanol, hexadecanol, isomers of propylamine, butylamine, pentylamine, hexylamine, heptylamine, octylamine, nonylamine, decylamine. undecylamine, dodecylamine, tridecylamine, tetradecylamine, pentadecylamine, hexadecylamine; dipropylamine, dibutylamine, dipentylamine, dihexylamine, diheptylamine, dioctylamine, dinonylamine, didecylamine. diundecylamine, didodecylamine, ditridecylamine, ditetradecylamine, dipentadecylamine, dihexadecylamine; tripropylamine, tributylamine, tripentylamine, trihexylamine, trioctylamine, trinonylamine, tridecylamine. triundecylamine, triheptylamine, tridodecylamine, tritridecylamine, tritetradecylamine, tripentadecylamine, trihexadecylamine; the heteroatomic organic compound is at least one of phosphates or phosphonates mono, di and tri ester derivatives and their isomers containing from 3 to 84 carbon atoms, butyl cellosolveethyl cellosolve, texanol, isophorone, morpholine, dioxane, dimethyl sulphoxide, dimethylformamide; the total content of polymers is from 65 to 95 wt %; the total content of polymers is from 75 to 97 wt %; the total content of polymers is from 85 to 97 wt %; the ratio of the poly(meth)acrylate weight and poly-alpha olefin weight varies in the range from 2:1 to 5:1.

In another aspect of the solution, a method of transportation of an oil product through a pipeline is disclosed, comprising the following stages:
- injection of the specified agent into the pipeline;
- transportation of the oil product containing the dissolved drag reducing agent.

The objective of the invention is to prepare a drag reducing agent for heavy crude oil containing a great amount of the active base to reduce the hydrodynamic drag of the flow of liquid hydrocarbon fluid, which can be injected as a dry form of product or dry powder, an additional objective is to increase the dissolution rate of drag reducing agents which improves the efficiency of the drag reducing property in heavy crude oil.

The technical result of the solution involves the preparation of an effective, fast-dissolving, stable dry drag reducing polymer powers suitable for use in heavy crude oil and injection into the oil pipeline through powder form with injection skid or equipment.

Essentially, a poly(meth)acrylate powder is prepared by spray drying of latex containing poly(meth)acrylates used to reduce hydrodynamic drag, this dry powder is mixed with powder form of poly alpha-olefins drag reducing polymers, an anti-agglomerating agent, surfactants, electively with a monofunctional heteroatomic organic compound with a carbon skeleton having a length from 4 to 28 units, a bifunctional heteroatomic organic compound a carbon skeleton having the length from 4 to 28 units, thus preparing a solid DRA. In this case, the mass fraction of poly(meth)acrylates is preferably from 65 to 97%, and more preferably from 75 to 97% and much more preferably from 85 to 97%.

Paraffins and asphaltenes in heavy oils have adverse affect with poly alpha olefin based drag reducing polymers. Asphaltenes coagulate poly alpha-olefins (penetrating the PAO molecule into its solvent shell), and paraffins stick to the PAO molecules, as a result diminishing drag reducing properties in crude oil pipeline. Therefore, it is challenging to use PAO based drag reducing agent in heavy crude oil.

The product prepared according to the described method is preferably fed into the flow of a hydrocarbon liquid transported through the pipeline using an injection skid or equipment that mechanically transfers the product through a screw auger or a screw feeder, for example, a screw extruder for polymeric materials, either directly into the flow of a hydrocarbon liquid or into an intermediate container for mixing the dry drag reducing material with pipeline liquid of the flow and by flowing the prepared mixture back into the main flow of the pipeline.

BRIEF DESCRIPTION OF DRAWINGS

The investigation on dissolution rate of solid dry polymer powder and liquid drag reducing agent prepared from above dry polymer powder for head to head comparison are given in FIG. 1.

DETAILED DESCRIPTION OF THE PREFERRED EMBODIMENTS

This section describes the main embodiment of the invention, which, however, does not limit other possible embodiments explicitly described in the application materials and apparent for a person skilled in the art.

The proposed agent for reducing the hydrodynamic drag of the flow of liquid hydrocarbons in pipelines is prepared according to the following main procedure.

First, latex comprising poly(meth)acrylates to reduce the drag is prepared. The latex particles of the drag reducing agent can be formed by polymerizing at least one or more than one monomers selected from the group comprising 1-adamantyl methacrylate, benzyl methacrylate, methylmethacrylate, butyl methacrylate, decyl methacrylate, diethylene glycol ether methacrylate, 2-(diethyl amino) ethyl methacrylate, 2-(diisopropyl amino) ethyl methacrylate, 2-(dimethyl amino) ethyl methacrylate, diethylene glycol ether butyl methacrylate, dodecyl methacrylate, ethylene glycol phenyl ether methacrylate, 2-ethyl-2-adamantyl methacrylate, 2-ethyl hexyl methacrylate, glycol methacrylate phosphate, hexyl methacrylate, octyl methacrylate, 2-hydroxy ethyl methacrylate, isobutyl methacrylate, isooctyl methacrylate, isodecyl methacrylate, stearyl methacrylate, 1-adamantyl acrylate, benzyl acrylate, butyl acrylate, decyl acrylate, diethylene glycol ether acrylate, 2-(diethyl amino) ethyl acrylate, 2-(diisopropyl amino) ethyl acrylate, 2-(dimethyl amino) ethyl acrylate, diethylene glycol ether butyl acrylate, dodecyl acrylate, ethylene glycol phenyl ether acrylate, 2-ethyl-2-adamantyl acrylate, 2-ethyl hexyl acrylate, hexyl acrylate, octyl acrylate, 2-hydroxy ethyl acrylate, isobutyl acrylate, iso-octyl acrylate, isodecyl acrylate, stearyl acrylate, acrylic acid, 2-acylamido-2-methyl-1-propanesulfonic acid, 2-acylamido-2-methyl-1-propanesulfonic acid sodium or potassium salts, C1 to C6 alcohol esters of acrylic acid or methacrylic acid, styrene, and combinations. The latex particles of drag reducing agent have a ultra-high molecular weight polymer, set herein as exceeding molecular weight of one million dalton.

The prepared liquid latex is dried by spray drying or dehydration process. The dried material is an active base for dry latex polymers with particle size ranges between 5-800 microns.

The powder of drag reducing poly alpha-olefins is prepared by cryogenic grinding of block of polymers. The polymer blocks are prepared according to the method described herein. To prepare the component of the claimed drag reducing agent, polyalphaolefins prepared from 1-hexene, 1-octene, 1-decene, 1-dodecene, 1-tetradecene, etc., as well as from the mixture of these monomers, can be applied.

The mixture of the above polymer particles forms active base powder. This active base powder is mixed with polymer non-dissolving solvents to prepare a product with a polymer content of at least 65 wt. %, which is fed into the flow of a hydrocarbon liquid pumped through a pipeline using a dry polymer powder injection skid or equipment. The percentage of the active base in the agent is measured, according to the required amount of additional components, which ensure the possibility of using the agent, the possibility of injection of it in the form of a powder.

In another embodiment, the polymer is prepared in the form of flakes. The form of flakes can be prepared in one of the following ways:
    latex prepared by emulsion polymerization can be dried by any technically feasible method of drying materials, for example, by preparing sheets of dried polymer in infrared belt dryers, after which the dry polymer sheets are crushed in crushers for polymer materials to chips with size from 0.3 mm up to 1.5 cm,
    the powder prepared in the spray dryer with a particle size from 5 microns to 800 microns can be agglomerated in industrial agglomeration apparatus to flakes ranging in size from 0.6 mm to 1.5 cm,
    preparation of flakes ranging in size from 0.6 mm to 1.5 cm by direct drying of latex in rotary dryers.

In case of using flakes, the embodiments are possible, in which the drag reducing agent is prepared by mixing the flakes of two polymers (poly(meth)acrylates, poly alpha-olefins) with an anti-agglomerating agent (up to 25% by weight) and this commodity form is transported to the station for feeding the agent into the oil pipeline. However, in this case, the station for injection of the agent must be adapted to injecting flakes, and not powder, that is, it must be equipped by means of grinding the flakes before feeding into the oil pipeline.

Metal stearates such as magnesium stearate, calcium stearate, strontium stearate, barium stearate, aluminum stearate, and zinc stearate, lithium stearate, stearic acid, ethylene bis-stearamide, polyethylene waxes, polypropylene waxes, fatty acids, fatty alcohols, fatty acid esters, polyvinyl ethylacetates, polyvinyl acetate, alcohol esters containing carbon atoms from 6 to 35, are used as anti-agglomerating agents.

Mixtures of a monofunctional heteroatomic organic compound (MHOC) and a bifunctional heteroatomic organic compound (BHOC) are used as separating agent. Organic compounds containing oxygen, nitrogen as a heteroatom—isomers of the monofunctional heteroatomic organic compound is fatty alcohol containing from 4 to 28 carbon atoms, aliphatic esters containing from 4 to 28 carbon atoms, aliphatic hydroxy carboxylic containing from 4 to 28 carbon atoms, bifunctional heteroatomic glycol containing from 4 to 28 carbon atoms; the monofunctional heteroatomic organic compound is at least one of isomers of propanol, butanol, pentanol, hexanol, heptanol, octanol, nonanol, decanol, undecanol, dodecanol, tridecanol, tetradecanol, pentadecanol, hexadecanol, isomers of propylamine, butylamine, pentylamine, hexylamine, heptylamine, octylamine, nonylamine, decylamine. undecylamine, dodecylamine, tridecylamine, tetradecylamine, pentadecylamine, hexadecylamine; dipropylamine, dibutylamine, dipentylamine, dihexylamine, diheptylamine, dioctylamine, dinonylamine, didecylamine. diundecylamine, didodecylamine, ditridecylamine, ditetradecylamine, dipentadecylamine, dihexadecylamine; tripropylamine, tributylamine, tripentylamine, trihexylamine, triheptylamine, trioctylamine, trinonylamine, tridecylamine. triundecylamine, tridodecylamine, tritridecylamine, tritetradecylamine, tripentadecylamine, trihexadecylamine; can be used as MHOC; organic compounds containing oxygen, nitrogen, sulphur, phosphorus as a heteroatom—the heteroatomic organic compound is at least one of phosphates or phosphonates mono, di and tri ester derivatives and their isomers containing from 3 to 84 carbon atoms, butyl cellosolve, ethyl cellosolve, texanol, isophorone, morpholine, dioxane, dimethyl sulphoxide, dimethylformamide, can be used as BHOC.

For mechanical mixing of polymer powder or flakes of polymers and non-dissolving solvents, any mixers design can be used, for example, GebrüderLödigeMaschinenbauGmbH (Germany), OOO Sibprommash (the Russian Federation, Novosibirsk).

For dosing a product containing, not less than 65 wt % of dry polymer powder or flakes of active ingredients, injection equipment can be used that mechanically move the product through a screw auger or screw feeder or similar equipment from other companies KinematicaAG (Switzerland), IKA-WERKE GmbH & Co. KG (Germany), KraussMaffeiBerstorff AG (Germany) extruders or analogs.

Methods for preparation of an agent for reducing the hydrodynamic drag of a flow of liquid hydrocarbons in pipelines are illustrated by the embodiments given below, but not limited to them.

Embodiment 1

Preparation of Dry Latex Polymer Powder

Install a 250 ml jacketed three-necked flask at a Heidolph magnetic stirrer, connect a circulation thermostat to the flask jacket through silicone hoses.

Place a fluoroplastic-coated magnetic stirrer into the flask. Add 69.3 g of distilled water in a flask, and set it up on the magnetic stirrer with stirrer rotation speed is 800 rpm. While stirring, place a rubber septum on the top or flask mouth, insert a 250 mm veterinary needle through the septum, with a nitrogen bottle from a reducer connected through a silicone hose, with a pressure of 0.01 MPa.

Add 55 g of 2-Ethyl hexyl methacrylate to the reaction flask with constant stirring and positive nitrogen supply. Then, add 5 g of sodium lauryl sulfate and 6.4 g of neonol 9-12 into the flask. The resulting mixture was stirred for 15 minutes or until sodium lauryl sulfate gets dissolved. Then, add 0.23 g of monosubstituted potassium phosphate and 0.18 g of disubstituted potassium phosphate to the reaction mixture. The reaction mixture was then purged with nitrogen for half an hour to ensure complete removal of residual oxygen or minimize the oxygen level.

After the nitrogen purging, add 0.2 g of ammonium persulphate (a source of radicals) to the reaction mixture.

After adding the source of radicals, switch on a circulation thermostat for the circulation of the heat-transfer medium in the jacket of the reaction flask. Place a thermocouple in the reaction mass to measure the reaction temperature. Maintain the reaction temperature at 15±1° C.

After the reaction mass reaches the set temperature, add a prepared solution of 0.1 g of Mohr's salt (initiating agent) in 40 g of distilled water with 0.01 mol/l of sulfuric acid into the flask. The rate of adding the initiating agent solution is about 8 g/h.

Do not stop the stirring and nitrogen purging during the polymerization process.

After complete consumption of monomer, dry latex polymer is prepared in the laboratory spray dryer at a temperature of 60±10° C. Also, 2 g of anti-agglomerating agent (calcium stearate) added.

Then, 3.4 g of octanol and 3.4 g of hexylene glycol added to the prepared powder and mixed well to get uniform mixing.

Preparation of t Poly-1-Hexene and Poly-1-1 Decene Copolymer Dry Powder

Feed 1-hexene 880 hgrams, and 1-decene 120 grams to the jacketed reactor with a thermocouple, pressure gauge, and nitrogen supply. Cool the alpha-olefins mixture in the reactor temperature at 10±2° C. with a cooling jacket via constant coolant circulation. Then feed 0.8 grams of aluminum alkyls co-catalyst, which is a mixture of diethylaluminum chloride and triisobutylaluminum, with a 1:1 ratio and 0.13 grams of Ti/Mg proprietary catalyst.

To ensure homogeneous mixing of the resulting mixture and then maintain the reactor temperature between 8 to 12° C. for an hour. The resulting mixture is transferred into an air tight container with polyethylene liners. The reaction mixture temperature is maintained at 15±5° ° C. for 15 days Grind the prepared block of polymer in liquid nitrogen temperature with calcium stearate, use a cascade of milling blades to grind the polymer subsequently into size-defined particles.

Add non-dissolving solvent consisting of a mixture of octanol and ethylene glycol in the ratio of 8:2 by weight to the prepared polymer powder, which is a stable fine dispersion with a polymer content 80±5 wt %.

Embodiment 2

Preparation of Dry Latex Polymer Powder

Install a 250 ml jacketed three-necked flask at a Heidolph magnetic stirrer, connect a circulation thermostat to the flask jacket through silicone hoses.

Place a fluoroplastic-coated magnetic stirrer into the flask. Add 69.3 g of distilled water in a flask, and set it up on the magnetic stirrer with rotation speed is 800 rpm. While stirring, place a rubber septum on the top or flask mouth, insert a 250 mm veterinary needle through the septum, with a nitrogen bottle from a reducer connected through a silicone hose, with a pressure of 0.01 MPa.

Add 55 g of isobutyl methacrylate to the reaction flask with constant stirring and positive nitrogen supply. Then, add 3 g of sodium lauryl sulfate into the flask. The resulting mixture was stirred for 15 minutes or until sodium lauryl sulfate gets dissolved. Then, add 0.23 g of monosubstituted potassium phosphate and 0.18 g of disubstituted potassium phosphate to the reaction mixture. The reaction mixture was then purged with nitrogen for half an hour to ensure complete removal of residual oxygen or minimize oxygen level.

After the nitrogen purging, add 0.2 g of ammonium persulphate (a source of radicals) to the reaction mass.

After adding the source of radicals, switch on a circulation thermostat for the circulation of the heat-transfer medium in the jacket of the reaction flask. Place a thermocouple in the reaction mass to measure the reaction temperature. Maintain the reaction temperature at 15±1° C.

After the reaction mass reaches the set temperature, add a prepared solution of 0.1 g of Mohr's salt (initiating agent) in 40 g of distilled water with 0.01 mol/l of sulfuric acid into the flask. The rate of adding the initiating agent solution is about 8 g/h.

Do not stop the stirring and nitrogen purging during the polymerization process.

After complete consumption of monomers, dry latex polymers prepared from latex slurry in the laboratory spray dryer at a temperature of 60±10° C. Also 1.17 g of anti-agglomerating agent (calcium stearate) added to the dry product.

Then, 0.59 g of octanol and 0.59 g of dimethyl sulfoxide added to the prepared powder and mixed well to get uniform mixing.

Preparation of Poly-1-Hexene and Poly-1-Tetradecene Copolymer Dry Powder

Feed 1-hexene 944 grams, 1-tetradecene 56 grams, to the jacketed reactor with a thermocouple, pressure gauge, and nitrogen supply. Cool the mixture in the reactor to the temperature at 10±2° C. with a cooling jacket via constant coolant circulation. Then feed 0.8 grams of aluminum alkyls co-catalyst, mixture of diethylaluminum chloride and tri-isobutylaluminum in a 1:1 ratio and 0.13 grams of Ti/Mg proprietary catalyst.

To ensure homogeneous mixing of the resulting mixture and then maintain the reactor temperature between 8 to 12° C. for an hour. The resulting mixture is transferred into an air tight container with polyethylene liners. The reaction mixture temperature is maintained at 15±5° ° C. for 15 days Grind the prepared block of polymer in liquid nitrogen temperature with calcium stearate, use a cascade of milling blades to grind the polymer subsequently into size-defined particles.

Add non-dissolving solvent consisting of a mixture of octanol and ethylene glycol in the ratio of 8:2 by weight to the prepared polymer powder, which is a stable fine dispersion with a polymer content 80±5 wt %.

Embodiment 3

Preparation of Dry Latex Polymer Powder

Install a 250 ml jacketed three-necked flask at a Heidolph magnetic stirrer, connect a circulation thermostat to the flask jacket through silicone hoses.

Place a fluoroplastic-coated magnetic stirrer into the flask. Add 69.3 g of distilled water in a flask, set it up on the magnetic stirrer with stirrer rotation speed is 800 rpm. While stirring, place a rubber septum on the top and flask mouth, insert a 250 mm veterinary needle through the septum, with a nitrogen bottle from a reducer connected through a silicone hose, with a pressure of 0.01 MPa.

Add 55 g of butyl methacrylate to the reaction flask with constant stirring and positive nitrogen supply. Then, add 5 g of sodium lauryl sulfate and 2.7 g of neonol 9-12 into the flask. The resulting mixture was stirred for 15 minutes or until sodium lauryl sulfate gets dissolved. Then, add 0.23 g of monosubstituted potassium phosphate and 0.18 g of disubstituted potassium phosphate to the reaction mixture. The reaction mixture was then purged with nitrogen for half an hour to ensure complete removal of residual oxygen or minimize oxygen level.

After the nitrogen purging, add 0.2 g of ammonium persulphate (a source of radicals) to the reaction mixture.

After adding the source of radicals, switch on a circulation thermostat for the circulation of the heat-transfer medium in the jacket of the reaction flask. Place a thermocouple in the reaction mass to measure the reaction temperature. Maintain the reaction temperature at 15±1° C.

After the reaction mass reaches the set temperature, add a prepared solution of 0.1 g of Mohr's salt (initiating agent) in 40 g of distilled water with 0.01 mol/l of sulfuric acid into the flask. The rate of adding the initiating agent solution is about 8 g/h.

Do not stop the stirring and nitrogen purging during the polymerization process.

After complete consumption of monomers, dry latex polymers prepared from latex slurry in the laboratory spray dryer at a temperature of 60±10° C. Also 1.17 g of anti-agglomerating agent (calcium stearate) added to the dry product.

Then, 8.8 g of tridecyl amine and 8.8 g of tripentyl phosphate added to the prepared powder and mixed well to get uniform mixing.

Preparation of the Agent's Polyalphaolefin Component

Feed 1-hexene 890 grams, and 1-decene 110 grams, to the jacketed reactor with a thermocouple, pressure gauge, and nitrogen supply. Cool the mixture in the reactor to temperature at 10±2° C. with a cooling jacket via a constant coolant circulation. Then feed 0.8 grams of aluminum alkyls co-catalyst, a mixture of diethylaluminum chloride and tri-isobutylaluminum in a 1:10 ratio and 0.13 grams of Ti/Mg proprietary catalyst.

To ensure homogeneous mixing of the resulting mixture and then maintain the reactor temperature between 8 to 12° C. for an hour. The resulting mixture is transferred into an air tight container with polyethylene liners. The reaction mixture temperature is maintained at 15±5° ° C. for 15 days Grind the prepared block of polymer in liquid nitrogen temperature with calcium stearate, use a cascade of milling blades to grind the polymer subsequently into size-defined particles.

Add non-dissolving solvent consisting of a mixture of ethyl cellosolve and propylene glycol in the ratio of 5:5 by weight to the prepared polymer powder, which is a stable fine dispersion with a polymer content 80±5 wt %.

Embodiment 4

Preparation of Dry Latex Polymer Powder

Install a 250 ml jacketed three-necked flask at a Heidolph magnetic stirrer, connect a circulation thermostat to the flask jacket through silicone hoses.

Place a fluoroplastic-coated magnetic stirrer into the flask. Add 69.3 g of distilled water in a measuring glass into the flask, switch on the magnetic drive of the stirrer, the stirrer rotation speed is 800 rpm. While stirring, place a rubber septum into the neck of the flask, insert a 250 mm veterinary needle through the septum, with a nitrogen bottle from a reducer connected through a silicone hose, with a pressure of 0.01 MPa.

Add 55 g of 2-Ethylhexyl methacrylate and isobutyl methacrylate in equal proportion to the reaction flask in the process of constant stirring and nitrogen supply. Then, add 5.4 g of neonol 9-12 into the flask. The resulting mixture was stirred for 15 minutes or until sodium lauryl sulfate gets dissolved. Then, add 0.23 g of monosubstituted potassium phosphate and 0.18 g of disubstituted potassium phosphate to the reaction mixture. The reaction mixture was then purged with nitrogen for half an hour to ensure complete removal of residual oxygen or minimize oxygen level.

After the nitrogen purging, add 0.2 g of ammonium persulphate (a source of radicals) to the reaction mixture.

After adding the source of radicals, switch on a circulation thermostat for the circulation of the heat-transfer medium in the jacket of the reaction flask. Place a thermocouple in the reaction mass to measure the reaction temperature. Maintain the reaction temperature at 15±1° C.

After the reaction mass reaches the set temperature, add a prepared solution of 0.1 g of Mohr's salt (initiating agent)

in 40 g of distilled water with 0.01 mol/l of sulfuric acid into the flask. The rate of adding the initiating agent solution is about 8 g/h.

Do not stop the stirring and nitrogen purging during polymerization process.

After complete consumption of monomers, dry latex polymers prepared from latex slurry in the laboratory spray dryer at a temperature of 60±10° C. Also 1.17 g of anti-agglomerating agent (calcium stearate) added to the dry product.

Then, 6.1 g of decanol and 3 g of texanol added to the prepared powder and mixed well to get uniform mixing.

Preparation of Poly-1-Hexene and Poly-1-Decene Copolymer Dry Powder

Feed 1-hexene 940 grams and 1-decene 60 grams to the jacketed reactor with a thermocouple, pressure gauge, and nitrogen supply. Cool the mixture in the reactor to temperature at 10±2° C. with a cooling jacket via a constant coolant circulation. Then feed 0.8 grams of aluminum alkyls co-catalyst, a mixture of diethylaluminum chloride and tri-isobutylaluminum in a 1:10 ratio and 0.13 grams of Ti/Mg proprietary catalyst.

To ensure homogeneous mixing of the resulting mixture and then maintain the reactor temperature between 8 to 12° C. for an hour. The resulting mixture is transferred into an air tight container with polyethylene liners. The reaction mixture temperature is maintained at 15±5° ° C. for 15 days Grind the prepared polymer block in liquid nitrogen with calcium stearate, use a cascade of milling blades to grind the polymer subsequently into size-defined particles.

Add non dissolving solvent consisting of a mixture of octanol and ethylene glycol in the ratio of 8:2 by weight to the prepared polymer powder, which is a stable fine dispersion with a polymer content 80±5 wt %.

Efficiency of Dry Drag Reducing Polymer Powders

The prepared drag reducing additives have higher dissolution rate as compared with corresponding liquid drag reducing slurries s because of higher dispersion or polymer contact with polymer particles and crude oil. For instance, in water based slurry polymer particles are surrounded with water molecules (carrier fluid) and required residence time to release polymer particles from the water molecules in crude oil. On the other hand, dry polymer powder do not required any residence time to release the polymer particles into the crude oil.

The laboratory experimental results are given below as compared the solubility with similar liquid and solid additives. The composition of the additives is given in Table 1.

TABLE 1

The composition of the additives under test

| Component name | Components wt. % | | |
|---|---|---|---|
| | Liquid latex additive | Dry latex additive (0.9 mm) | Dry latex additive (0.3 mm) |
| Polymer | 39 | 75 | 71 |
| Water | 53 | — | — |
| Surfactants | 8 | 15 | 14.5 |
| Anti-agglomerating agent and separating agent | — | 10 | 14.5 |

TABLE 2

Physical and chemical properties of oil

| Name | Index |
|---|---|
| Density at 20° C., kg/m³: | 900-908 |
| Oil freezing point, ° C. | +2 |
| Paraffin wt. % | 5.4-6.7 |
| Kinematic viscosity at 20° C., mm²/s | 121 |
| Water wt. % | Up to 0.5 |
| Mechanical impurities wt. % | 0.0008-0.0100 |

The tests are based on measuring the viscosity of oil at 60° C. (general temp at crude oil pipeline for transportation) over time using a Brookfield viscometer in a temperature-controlled cell. Inject 1% of liquid drag reducing slurry into oil using a syringe. Using a spatula, add the dry latex additive (0.9 mm) to oil in an amount of 0.52%, the dry latex additive (0.3 mm) to oil in an amount of 0.55%, for the same polymer content in oil. Mix the oil with the DRA using a magnetic stirrer. The data obtained are given in Table 3 and in FIG. 1.

TABLE 3

The solubility of latex additives in Customer's oil at 60° C.

| Time, min | Liquid latex additive | Dry latex additive (0.3 mm) | Dry latex additive (0.9 mm) |
|---|---|---|---|
| 0 | 36.0 | 35.8 | 34.1 |
| 15 | 38 | 67 | 55 |
| 30 | 39 | 76 | 66 |
| 45 | 49 | 82 | 77 |
| 60 | 54 | 85 | 85 |
| 90 | 58 | 89 | 93 |
| 120 | 66 | 97 | 102 |
| 150 | 74 | | |
| 180 | 79 | | |
| 210 | 82 | | |
| 240 | 89 | | |
| 270 | 96 | | |
| 300 | 98 | | |

Figure 1:
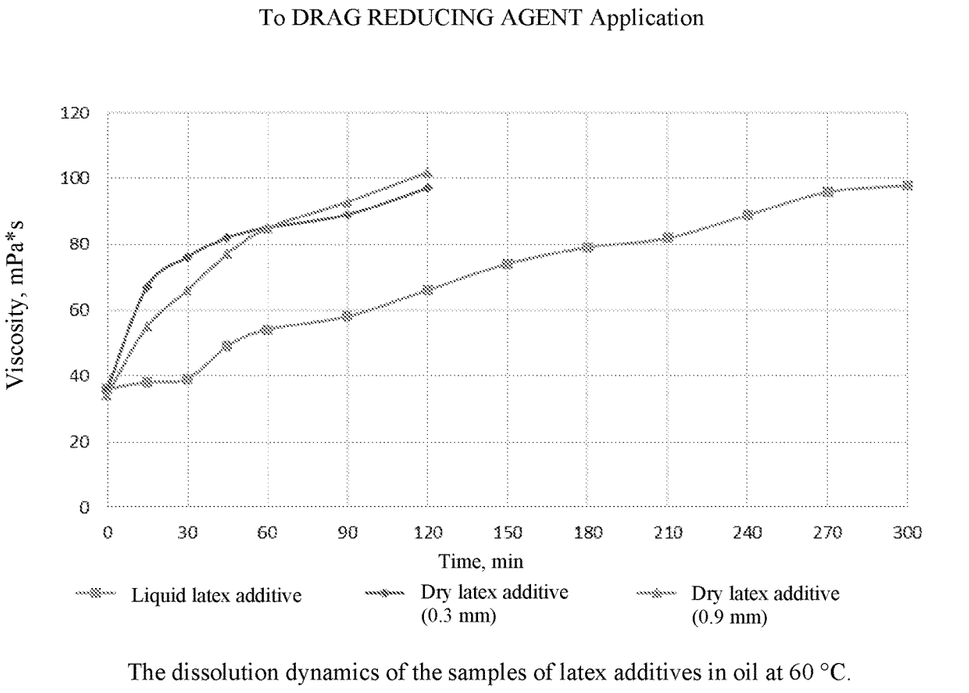
FIG. 1 shows the dissolution dynamics of the samples of latex additives in oil at 60° C.

The dissolution dynamics of the samples is given in FIG. 1. A sample of the latex additive in the form of a liquid slurry dissolves very slowly in oil. But, the latex additive sample is dried and ground to 0.9 mm flakes or 0.3 mm powder, the solubility of the resulting polymer powders increases significantly.

Further the mixer of poly alpha-olefins and poly methacrylate were investigated on hydrodynamic drag reduction experiments. The test was performed in heavy crude oil, in which poly alpha-olefin additives have no effect on their own. The results obtained are given in Table 4.

TABLE 4

The effect of the poly alpha-olefin addition to latex polymer powder

| Additive | Concentration, ppm | | | | |
|---|---|---|---|---|---|
| | 10 | 20 | 50 | 100 | 150 |
| 1. Polyacrylate-based (AC) | 17.2 | 24.7 | 38.6 | 41.1 | 42.2 |
| 2. PAO- polymer | 0.2 | 1.4 | 3.5 | 3.7 | 3.9 |
| 3. Overall effectiveness of versions 1 and 2 (1:1) | 17.4 | 26.1 | 42.1 | 44.8 | 46.1 |
| 4. AC + PAO 1:3 | 10.5 | 20.9 | 32.2 | 34.3 | 35.8 |
| 5. AC + PAO 1:1 | 17.6 | 27.5 | 42.6 | 45.8 | 46.6 |
| 6. AC + PAO 2:1 | 18.3 | 28.6 | 44.1 | 46.2 | 46.9 |
| 7. AC + PAO 3:1 | 18.9 | 30.9 | 45.3 | 46.7 | 47.2 |

TABLE 4-continued

The effect of the poly alpha-olefin addition to latex polymer powder

| Additive | Concentration, ppm | | | | |
|---|---|---|---|---|---|
| | 10 | 20 | 50 | 100 | 150 |
| 8. AC + PAO 4:1 | 18.2 | 29.4 | 43.7 | 46 | 47.1 |
| 9. AC + PAO 5:1 | 17.8 | 28 | 43.2 | 45.9 | 47.1 |

As you can see in Table 4, adding PAO polymer to poly(meth)acrylate improves the drag performance properties, besides by proportion of AC:PAO 3:1 shows optimum drag reduction performance as compared with other ratios.

The asphaltenes define the solvent ability of heavy crude oil in relation to the polymer. In the case of use of the poly alpha-olefin additive in heavy oil, it has no effect as it does not dissolve. That is the PAO coils of the polymer do not swell, which does not result in uncoiling of the polymer.

There are polar carboxylate ester groups in the latex additive, have very strong interactions with asphaltenes as a result the additive's solubility increases along with the increasing drag reducing efficiency.

When using a mixture of latex and poly alpha-olefin additives, a synergistic effect is observed and the agent has a higher efficiency than when using these additives separately. First, the latex additive begins to dissolve, which involves the dissolution of the poly alpha-olefin additive.

An acrylate-based additive prevents paraffin sticking to PAO molecules (has an effect of a acts as an anti depressor) and replaces PAO molecules in the solvent shell of asphaltenes without coagulation. This enables the PAO molecules to uncoil and have an effect of a drag reducing additive.

As follows from the above data, it may be concluded that the claimed agent provides fast and effective reduction of a hydrodynamic drag of a turbulent flow of heavy oils in pipelines and, as a result, provides ramp-up, and reduction in expenses for transporting a hydrocarbon liquid.

The embodiments are not limited to the embodiments described herein, other embodiments of the invention staying within the essence and scope of the present invention will be apparent for a person skilled in the sphere of technologies based on the information set forth and the knowledge of the state of art.

The elements in the singular do not exclude the plurality of the elements unless otherwise specified.

The methods disclosed herein comprise one or more steps or stages to implement the described solution. The steps and/or stages of the method can be substituted for each other staying within the claims of the invention. In other words, if a specific order of steps or stages is not established, the order and/or use of specific steps and/or stages may vary staying within the claims of the invention.

Although exemplary embodiments have been described in detail and shown in the accompanying drawings, it should be understood that such embodiments are illustrative only and are not used to limit the broader invention and that the invention should not be limited to the specific configurations and structures shown and described, as other various modifications may be apparent to the persons skilled in the relevant field.

The features mentioned in various dependent claims, as well as the implementations disclosed in various parts of the description, can be combined to achieve the advantageous effect, even if the possibility of such a combination is not disclosed explicitly.

What is claimed is:

1. An agent for reducing a hydrodynamic drag of a turbulent flow of hydrocarbon liquids in pipelines, comprising solid dry form of the following components, wt %:
   a mixture in a form of powder or flakes, the mixture of at least two drag reducing polymers from 65 to 90
   a separating agent from 3 to 25
   an anti-agglomerating agent from 3 to 25
   a surfactant from 3 to 25,
   wherein the first polymer is at least one poly(meth) acrylate derivatives such as 1-adamantyl methacrylate, benzyl methacrylate, methylmethacrylate, butyl methacrylate, decyl methacrylate, diethylene glycol ether methacrylate, 2-(diethyl amino) ethyl methacrylate, 2-(diisopropyl amino) ethyl methacrylate, 2-(dimethyl amino) ethyl methacrylate, diethylene glycol ether butyl methacrylate, dodecyl methacrylate, ethylene glycol phenyl ether methacrylate, 2-ethyl-2-adamantyl methacrylate, 2-ethyl hexyl methacrylate, glycol methacrylate phosphate, hexyl methacrylate, octyl methacrylate, 2-hydroxy ethyl methacrylate, isobutyl methacrylate, iso-octyl methacrylate, isodecyl methacrylate, stearyl methacrylate, 1-adamantyl acrylate, benzyl acrylate, butyl acrylate, decyl acrylate, diethylene glycol ether acrylate, 2-(diethyl amino) ethyl acrylate, 2-(diisopropyl amino) ethyl acrylate, 2-(dimethyl amino) ethyl acrylate, diethylene glycol ether butyl acrylate, dodecyl acrylate, ethylene glycol phenyl ether acrylate, 2-ethyl-2-adamantyl acrylate, 2-ethyl hexyl acrylate, hexyl acrylate, octyl acrylate, 2-hydroxy ethyl acrylate, isobutyl acrylate, iso-octyl acrylate, isodecyl acrylate, stearyl acrylate, acrylic acid, 2-acylamido-2-methyl-1-propanesulfonic acid, 2-acylamido-2-methyl-1-propanesulfonic acid sodium or potassium salts, C1 to C6 alcohol esters of acrylic acid or methacrylic acid, styrene, and combinations thereof;
   the second polymer is at least one polyalphaolefin selected from the group consisting of 1-hexene, 1-octene, 1-decene, 1-dodecene, 1-tetradecene and combinations of thereof,
   the ratio of the poly(meth)acrylate weight and poly alpha-olefin weight varies in the range from 2:1 to 5:1;
   the agent being in a form of powder or flakes.

2. The agent of claim 1, wherein the anti-agglomerating agent is at least one anti-agglomerating agent selected from a group consisting of a monofunctional heteroatomic organic compound with a carbon skeleton having a length from 4 to 28 units, a bifunctional heteroatomic glycol containing from 4 to 28 carbon atoms, a polydimethylsiloxane.

3. The agent of claim 2, wherein the monofunctional heteroatomic organic compound is fatty alcohol containing from 4 to 28 carbon atoms, aliphatic esters containing from 4 to 28 carbon atoms, aliphatic hydroxy carboxylic containing from 4 to 28 carbon atoms; the bifunctional heteroatomic organic compound is at least one of phosphates or phosphonates mono, di and tri ester derivatives and their isomers containing from 3 to 84 carbon atoms.

4. The agent of claim 2, wherein the monofunctional heteroatomic organic compound is at least one of isomers of propanol, butanol, pentanol, hexanol, heptanol, octanol, nonanol, decanol, undecanol, dodecanol, tridecanol, tetradecanol, pentadecanol, hexadecanol, the isomers of propylamine, butylamine, pentylamine, hexylamine, heptylamine, octylamine, nonylamine, decylamine, undecylamine, dodecylamine, tridecylamine, tetradecylamine, pentadecylamine, hexadecylamine; dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine; tripropylamine, tributylamine, tripentylamine, trihexylamine, triheptylamine, trioctylamine, trinonylamine, tridecylamine, triundecylamine, tridodecylamine, tritridecylamine, tritetradecylamine, tripentadecyl amine, trihexadecylamine.

5. The agent of claim 2, wherein the bifunctional heteroatomic organic compound is at least one of tripropyl phosphate, tributyl phosphate, tripentyl phosphate, propylene glycol, butylene glycol, butyl cellosolve, hexylene glycol, ethyl cellosolve, texanol, diethylene glycol, triethylene glycol, isophorone, morpholine, dioxane, dimethyl sulphoxide, dimethylformamide.

6. The agent of claim 1, wherein the total content of polymers is from 85 to 90 wt %.

7. The agent of claim 1, wherein the ratio of the poly(meth)acrylate weight and poly alpha-olefin weight varies in a range from 3:1 to 5:1.

8. The agent of claim 1, wherein the ratio of the poly(meth)acrylate weight and poly alpha-olefin weight varies in a range from 3:1 to 4:1.

9. The agent of claim 1, wherein the mixture of at least two drag reducing polymers from 75 to 90.

10. The agent of claim 1, wherein the mixture of at least two drag reducing polymers from 80 to 90.

11. The agent of claim 1, wherein the mixture of at least two drag reducing polymers from 85 to 90.

* * * * *